United States Patent
Yusa et al.

(10) Patent No.: US 11,654,839 B2
(45) Date of Patent: *May 23, 2023

(54) RESIN MOLDED ARTICLE, MOLDING DEVICE, AND MOLDING METHOD

(71) Applicant: HONDA MOTOR CO., LTD., Tokyo (JP)

(72) Inventors: Atsushi Yusa, Tochigi (JP); Kenichi Chujo, Tochigi (JP); Yusuke Takamura, Tochigi (JP); Hajime Miyamoto, Tochigi (JP); Toshio Kazami, Tochigi (JP); Satoru Iriyama, Tochigi (JP); Masahiko Nakayama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 442 days.

This patent is subject to a terminal disclaimer.

(21) Appl. No.: 16/760,699

(22) PCT Filed: Oct. 24, 2018

(86) PCT No.: PCT/JP2018/039500
§ 371 (c)(1),
(2) Date: Apr. 30, 2020

(87) PCT Pub. No.: WO2019/087896
PCT Pub. Date: May 9, 2019

(65) Prior Publication Data
US 2020/0346594 A1 Nov. 5, 2020

(30) Foreign Application Priority Data
Nov. 6, 2017 (JP) .............................. JP2017-214012

(51) Int. Cl.
*B60R 13/02* (2006.01)
*B29C 45/33* (2006.01)
(Continued)

(52) U.S. Cl.
CPC .......... *B60R 13/0256* (2013.01); *B29C 45/33* (2013.01); *B29C 65/48* (2013.01);
(Continued)

(58) Field of Classification Search
None
See application file for complete search history.

(56) References Cited

FOREIGN PATENT DOCUMENTS

| CN | 103867940 A | 6/2014 |
|---|---|---|
| JP | 6-23849 | 2/1994 |

(Continued)

OTHER PUBLICATIONS

Chinese Office Action dated May 28, 2021, 8 pages.
(Continued)

*Primary Examiner* — Alexander S Thomas
(74) *Attorney, Agent, or Firm* — Rankin, Hill & Clark LLP

(57) ABSTRACT

An instrument panel unit (2) includes an instrument panel (3) and a decorative sheet (4). The instrument panel (3) includes a sticking portion (3a) and an exposed portion (3b). A plurality of insertion grooves 3c and insertion holes 3d are formed alternately at an end on a rear side of the sticking portion (3a), into which bent pieces (4a) formed at a rear end of the decorative sheet (4) are inserted. A groove front-surface (3g) forming the insertion groove (3c) of the instrument panel (3) is formed in a tapered shape such that a width between the groove front-surface and an opposing groove rear-surface (3h) gradually increases upwardly. The bent piece (4a) is formed to be thinner than the groove width at (Continued)

the upper part serving as the entrance part of the insertion groove (3c) and to be thicker than the groove width of a groove bottom-surface (3i).

6 Claims, 15 Drawing Sheets

(51) Int. Cl.
    *B29C 65/48*     (2006.01)
    *B60K 35/00*     (2006.01)
    *B29L 31/30*     (2006.01)

(52) U.S. Cl.
    CPC ....... *B60K 35/00* (2013.01); *B29L 2031/3008* (2013.01); *B60K 2370/654* (2019.05); *Y10T 428/2419* (2015.01)

(56) References Cited

FOREIGN PATENT DOCUMENTS

| | | |
|---|---|---|
| JP | 2000-167935 | 6/2000 |
| JP | 2000167935 A * | 6/2000 |
| JP | 2001-314290 A | 11/2001 |

OTHER PUBLICATIONS

International Search Report dated Nov. 27, 2018, Application No. PCT/JP2018/039500, 2 pages.
Japanese Office Action dated Mar. 2, 2021, 4 pages.

* cited by examiner

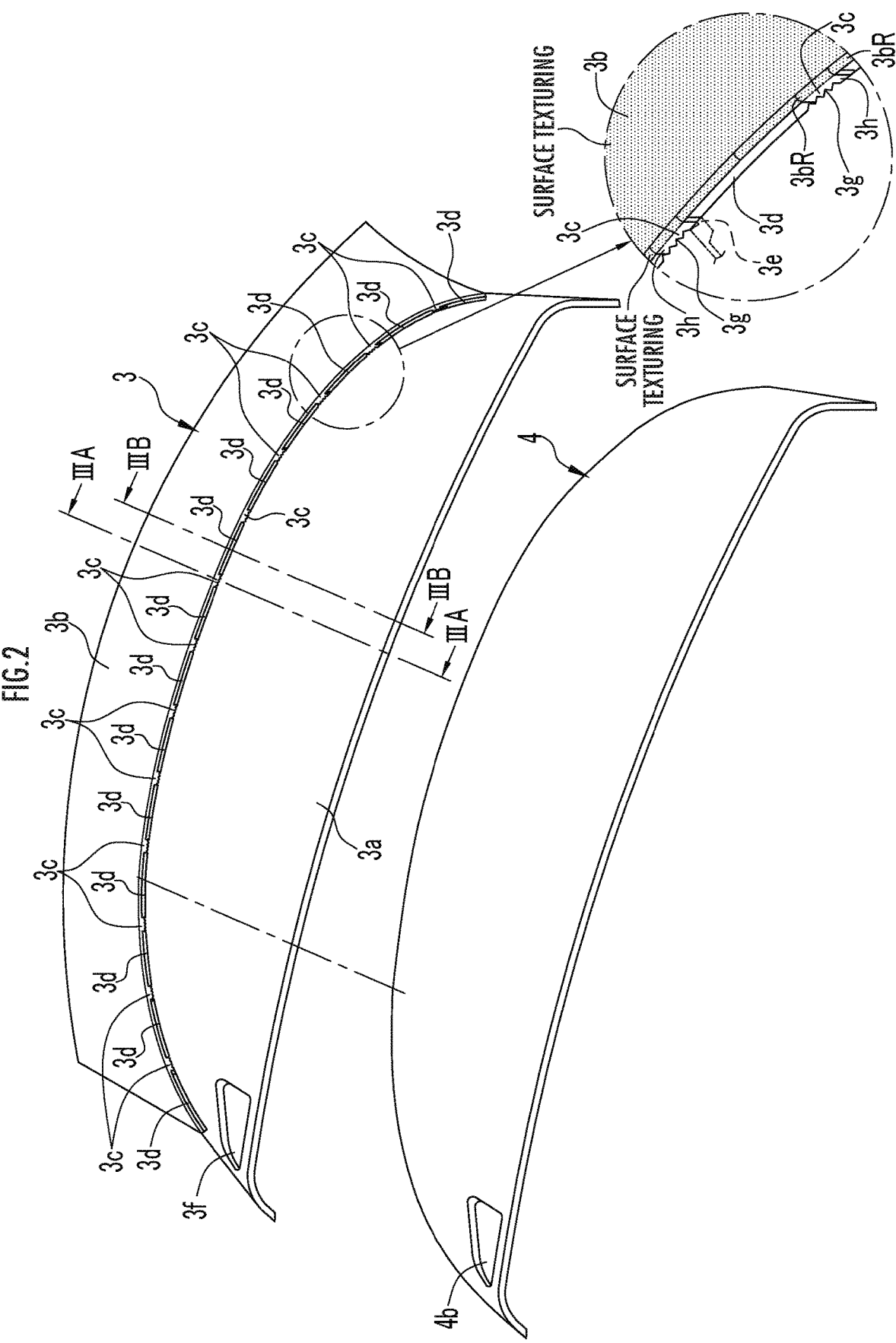

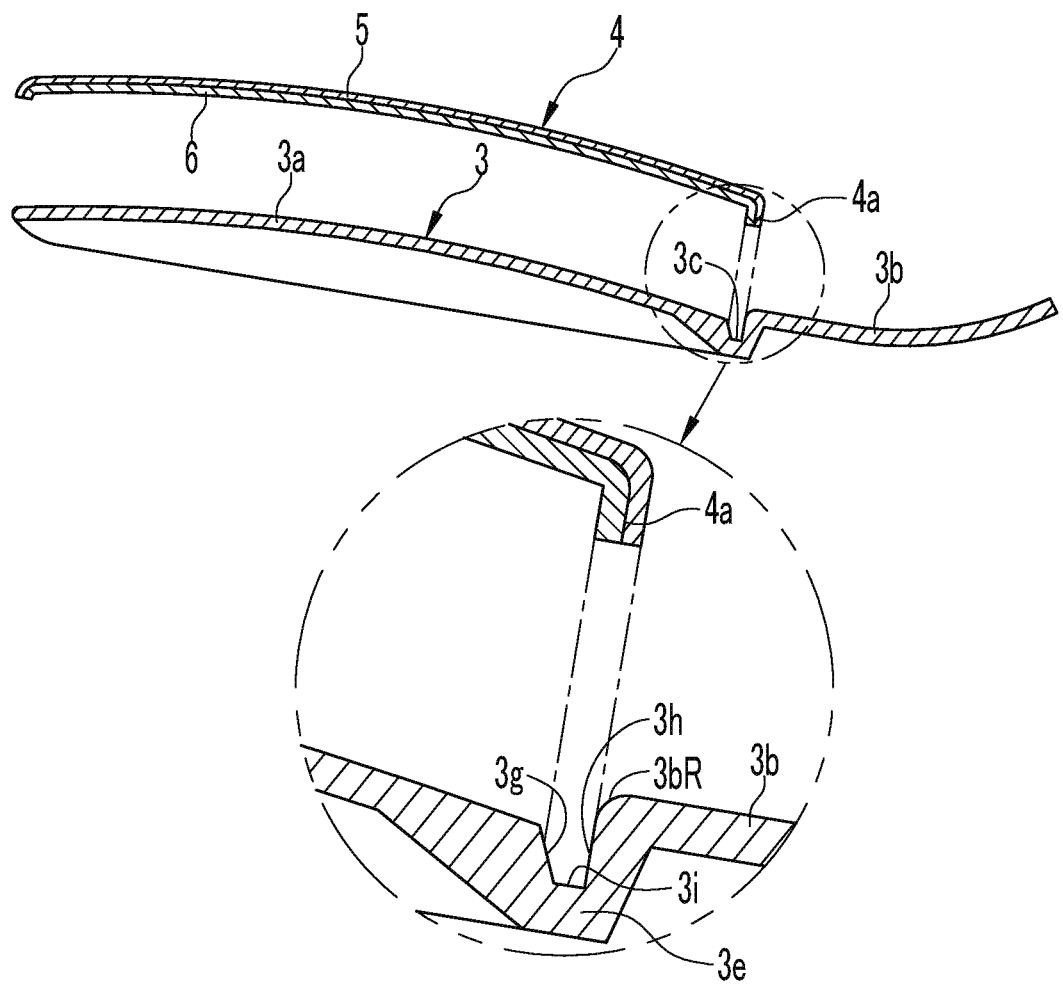

RESIN MOLDED ARTICLE, MOLDING DEVICE, AND MOLDING METHOD

TECHNICAL FIELD

The present invention relates to a resin molded article, a molding device, and a molding method.

BACKGROUND ART

Since an instrument panel provided in a vehicle can be visually recognized by occupants, high design properties are required. A groove is provided in a resin instrument panel, the groove is fitted with an edge of a sheet having design properties, and the sheet is stuck to the instrument panel (for example. Patent Literature 1).

In Patent Literature 2, an edge of a sheet is inserted into a groove in a state where a groove width is widened by deformation of a portion of an instrument panel in which the groove is formed, and thus work of attaching the sheet to the instrument panel is facilitated.

CITATION LIST

Patent Literature

Patent Literature 1: Japanese Patent Laid-Open No. H6-023849
Patent Literature 2: Japanese Patent Laid-Open No. 2000-167935

SUMMARY OF INVENTION

Technical Problem

In Patent Literatures 1 and 2, it is necessary to form a groove over almost the entire width of the instrument panel. When such a long range of groove is molded by injection molding, molding defects easily occur. When the molding defects occur, shape defects may occur in a resin molded article.

The present invention has been made in view of such circumstances, and is intended to provide a resin molded article, a molding device, and a molding method that can reduce shape defects.

Solution to Problem

A resin molded article according to the present invention is a resin molded article in which a fitting portion fitted with a bent piece formed at one end of an attachment member is extendedly provided, the attachment member being attached to a surface of the resin molded article, and the fitting portion includes: an insertion hole into which the bent piece is inserted, the insertion hole penetrating from the surface to a rear surface; and an insertion groove into which the bent piece is inserted, the insertion groove being formed in the surface in a recess shape.

When the insertion groove is molded in the resin molded article, it is necessary to form a protrusion portion in a resin molding die. In this case, when die opening is performed after the completion of the resin molding, it is necessary to pull out the protrusion portion of the die from the insertion groove of the resin molded article, and the resin molded article may be pulled during the pulling. In the resin molded article, when the pulling range of the protrusion portion is increased, molding defects may occur due to pulling and deformation of the resin molded article.

According to the resin molded article according to the present invention, since the fitting portion fitted with the bent piece of the attachment member is configured by the insertion hole and the insertion groove, the pulling range of the protrusion portion of the die can be reduced as compared with a case where the fitting portion is configured only by the insertion groove. Thus, molding defects can be reduced and shape defects of the resin molded article can be reduced.

Preferably, the fitting portion is extendedly provided in a non-linear shape in a longitudinal direction of the resin molded article.

When the fitting portion is molded to extend in the non-linear shape in the longitudinal direction of the resin molded article, a fore for pulling the resin molded article increases during the pulling of the protrusion portion of the die and molding defects easily occur as compared with a case where a short fitting portion is molded in a linear shape.

According to the configuration described above, even when the fitting portion extending in the non-linear shape in the longitudinal direction is molded, molding defects can be reduced and shape defects of the resin molded article can be reduced.

Preferably, one end surface of the bent piece abuts on a bottom surface of the insertion groove, and lateral surfaces of the bent piece abut on lateral surfaces of the insertion groove.

According to the configuration described above, the bent piece can be positioned by the insertion groove.

Preferably, a first lateral surface which abuts on a rear surface of the bent piece, of lateral surfaces of the insertion groove, is formed such that a width between the first lateral surface and an opposing second lateral surface gradually increases in a direction from the rear surface toward the surface.

According to the configuration described above, the bent piece is easily inserted into the insertion groove as compared with a case where the first lateral surface and the second lateral surface has the same width.

Preferably, an uneven portion is formed on the first lateral surface.

According to the configuration described above, the bent piece inserted into the insertion groove is hardly removed as compared with a case where the first lateral surface has no unevenness.

Preferably, a plurality of the insertion holes and a plurality of the insertion grooves are provided alternately.

According to the configuration described above, the insertion groove can be provided in a narrower range, and molding defects can be further reduced.

A molding device according to the present invention is a molding device including a first resin molding die and a second resin molding die that are capable of being separated from each other in a first direction, the molding device being configured to mold a resin molded article in which a fitting portion fitted with a bent piece formed at one end of an attachment member is extendedly provided, the attachment member being attached to a surface of the resin molded article, the molding device comprising: insertion hole molding portions that are respectively provided in the first resin molding die and the second resin molding die, and which abut on each other during molding of the resin molded article, and are configured to mold an insertion hole into which the bent piece is inserted, the insertion hole being formed as a part of the fitting portion to penetrate from the surface of the resin molded article to a mar surface; and an insertion groove molding portion that is provided in the first resin molding die configured to mold the surface of the resin molded article, the insertion groove molding portion being provided so as to be movable in a second direction inclined with respect to the first direction and being configured to mold an insertion groove into which the bent piece is inserted, the insertion groove being formed as a part of the fitting portion on the surface of the resin molded article.

According to the molding device of the present invention, since the first resin molding die includes the insertion hole molding portion and the insertion groove molding portion, it is possible to reduce the range of the protrusion portion of the die that forms the insertion groove as compared with a case where the insertion hole molding portion is not provided. Thus, molding defects can be reduced.

Preferably, the first resin molding die molds an upper end of a second lateral surface opposite to a first lateral surface, which abuts on a rear surface of the bent piece, of lateral surfaces of the insertion groove, and the insertion groove molding portion molds parts of the second lateral surface excluding the upper end.

According to the configuration described above, since the upper end of the second lateral surface of the insertion groove is molded by the first resin molding die, for example, when the first resin molding die is subjected to surface texturing, the upper end of the second lateral surface can also be brought into in a surface-textured state. Thus, even when the upper end of the second lateral surface can be visually recognized, design properties can be maintained.

A molding method according to the present invention is a resin molded article molding method of, using a resin molded article molding device including a first resin molding die and a second resin molding die that are capable of being separated from each other in a first direction, molding a resin molded article in which a fitting portion fitted with a bent piece formed at one end of an attachment member is extendedly provided, the attachment member being attached to a surface of the resin molded article, the molding method comprising: causing a first abutting portion provided on the first resin molding die to abut on a second abutting portion provided on the second resin molding die and molding an insertion hole into which the bent piece is inserted, the insertion hole being formed as a par of the fitting portion to penetrate from the surface of the resin molded article to a rear surface thereof; and molding an insertion groove into which the bent piece is inserted, the insertion groove being formed as a part of the fitting portion on the surface of the resin molded article, using a groove molding portion that is provided in the first resin molding die configured to mold the surface of the resin molded article, the groove molding portion being provided so as to be movable in a second direction inclined with respect to the first direction.

According to the molding method of the present invention, since the insertion hole and the insertion groove are molded in the resin molded article, it is possible to reduce the range of the protrusion portion of the die that forms the insertion groove as compared with a case where the insertion hole is not molded. Thus, molding defects can be reduced.

BRIEF DESCRIPTION OF DRAWINGS

FIG. 2 is a perspective view showing an instrument panel and a decorative sheet.

FIG. 3A is a cross-sectional view taken along line IIIA-IIIA.

DESCRIPTION OF EMBODIMENT

An embodiment of the present invention will be described below with reference to the drawings.

Figure 1:
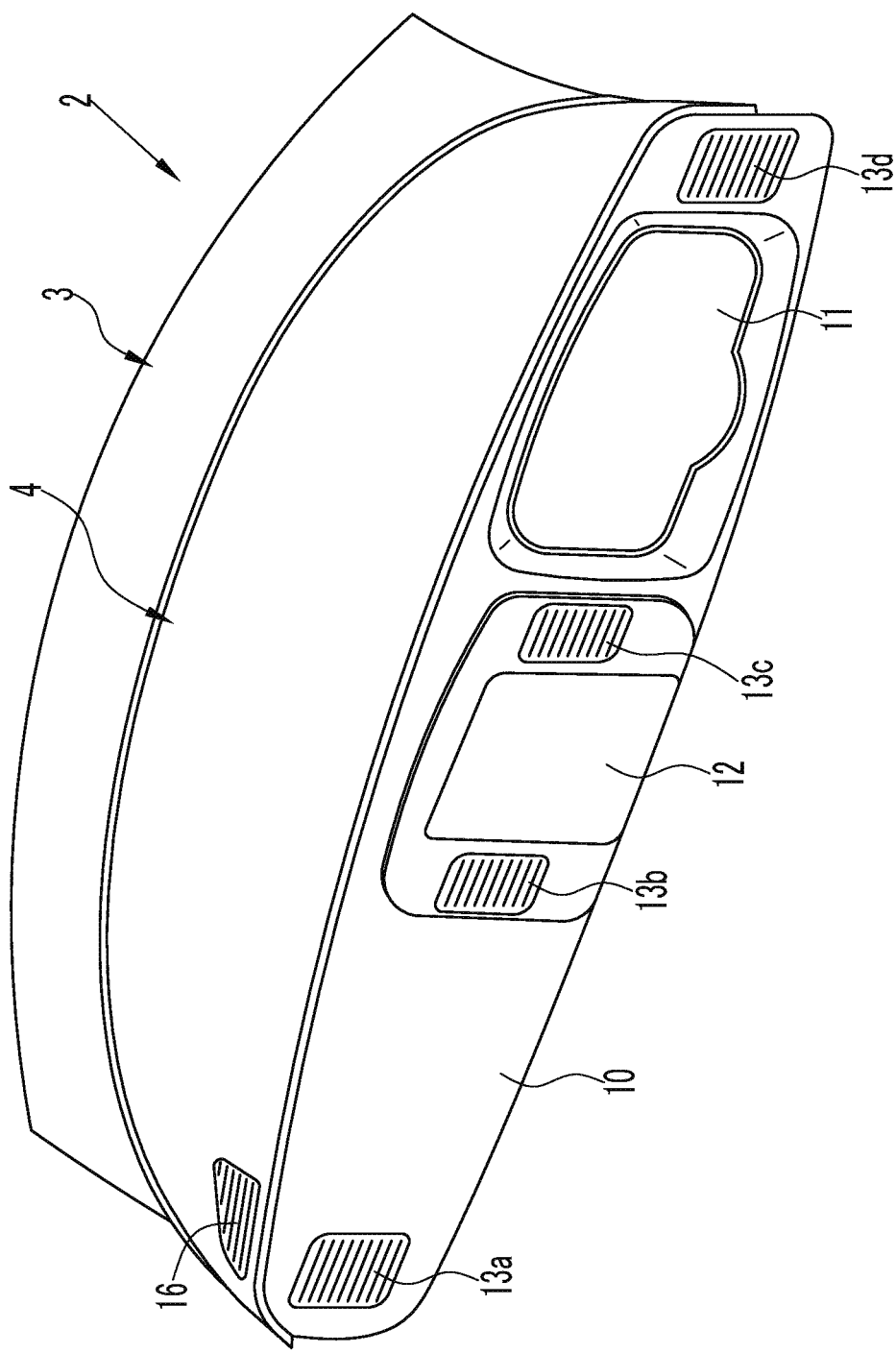
FIG. 1 is a schematic perspective view showing an instrument panel unit according to the present invention.

As shown in FIGS. 1 and 2, an instrument panel unit 2 is used for a vehicle, and comprises an instrument panel 3 (resin molded article), which is a resin molded article, and a decorative sheet 4 (attachment member) attached to a surface of the instrument panel 3. As will be described below, the decorative sheet 4 comprises a sheet-like cover 5 having design properties and a sheet-like foam material 6 (see FIG. 3A).

A front panel 10 is attached to the instrument panel 3. The front panel 10 includes an instrument display 11 on which instruments such as a speedometer, a tachometer, and an odometer are displayed, an electronic device display 12 for electronic devices such as a car navigation device and an audio device, and first to fourth air blowing portions 13a to 13d configured to blow air from an air conditioner (not shown). In addition, a steering (not shown) is attached to a lower part of the instrument display 11 in the front panel 10.

Figure 3B:
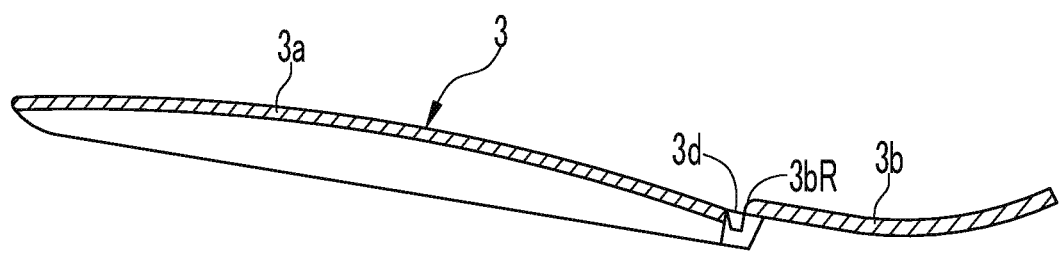
FIG. 3B is a cross-sectional view taken along line IIIB-IIIB.

As shown in FIGS. 2,3A, and 3B the instrument panel 3 comprises a sticking portion 3a having a surface to which the decorative sheet 4 is stuck and an exposed portion 3b provided behind the sticking portion 3a and exposed in a state where occupants of the vehicle can visually recognize.

A plurality of insertion grooves 3c and insertion holes 3d (for example, 13 insertion grooves 3c and 14 insertion holes 3d), into which bent pieces 4a formed at a rear end of the decorative sheet 4 are inserted, are formed at an end on a rear side (on the exposed portion 3b side) of the sticking portion 3a. The insertion grooves 3c and the insertion holes 3d are formed alternately. The insertion grooves 3c and the insertion holes 3d form a fitting portion. In the present embodiment, the insertion grooves 3c and the insertion holes 3d are depicted in an exaggerated way and sizes of the insertion grooves 3c and the insertion holes 3d can be changed as appropriate. Further, the number of the insertion grooves 3c may be one and the number of the insertion holes 3d may be one.

A protrusion portion 3e protruding in a downward direction is formed in a part of the insertion groove 3c, and the insertion groove 3c is formed in the protrusion portion 3e. In addition, an air blowing hole 3f is formed in the sticking portion 3a to blow air. At a front end of the exposed portion 3b, a front end rounded portion 3bR having a rounded shape is formed.

The decorative sheet 4 is configured by bonding of the cover 5 on the foam material 6, and is formed in a shape corresponding to the sticking portion 3a of the instrument panel 3. In the present embodiment, a thickness of the cover 5 is depicted in an exaggerated way.

An air blowing hole 4b is formed in the decorative sheet 4 at a position corresponding to the air blowing hole 3f of the instrument panel 3. The air blowing hole 4b is formed to penetrate through the cover 5 and the foam material 6. An air blowing portion 16 is attached to the air blowing hole 3f and the air blowing hole 4b (see FIG. 1).

As shown in FIG. 3A, a groove front-surface 3g (first lateral surface) forming the insertion groove 3c of the instrument panel 3 is formed in a tapered shape such that a width between the groove front-surface and an opposing groove rear-surface 3h (second lateral surface) gradually increases in an upward direction. The groove front-surface 3g is formed in an uneven shape. The groove front-surface 3g is not limited to the tapered shape, and may have a shape in which a linear line parallel to the groove rear-surface 3h and an inclined taper line are combined, may have a stepped shape, or may further have a linear shape parallel to the groove rear-surface 3h. In addition, the groove front-surface 3g may have a flat shape without unevenness.

The bent piece 4a of the decorative sheet 4 is formed to be thinner than widths (hereinafter, referred to as groove widths) of the groove front-surface 3g and the groove rear-surface 3h at an upper part serving as an entrance part of the insertion groove 3c and to be thicker than a groove width of a groove bottom-surface 3i in the insertion groove 3c. The width of the bent piece 4a can be changed as appropriate, and may be narrower than the groove width at the upper part serving as the entrance part of the insertion groove 3c or the groove width of the groove bottom-surface 3i.

Next, a description will be given with respect to a unit molding device 50 used to mold the instrument panel unit 2 by sticking the decorative sheet 4 to the sticking portion 3a of the instrument panel 3.

Figure 4:
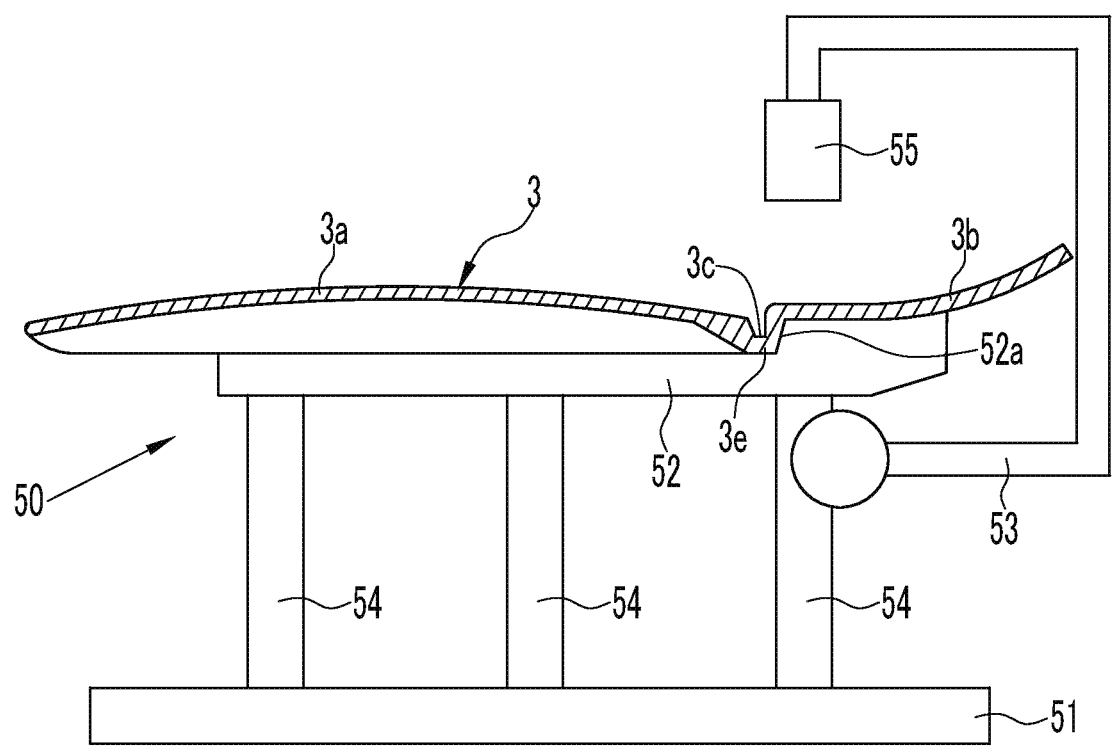
FIG. 4 is a side view showing the instrument panel and a unit molding device.

As shown in FIG. 4, the unit molding device 50 comprises a base 51, a placing table 52 on which the instrument panel 3 is placed, and a moving portion 53. The placing table 52 is fixed to three support pillars 54 provided on the base 51.

The placing table 52 is formed with a positioning portion 52a configured to perform positioning of the instrument panel 3, and the instrument panel 3 is positioned by pushing of the protrusion portion 3e against the positioning portion 52a.

The moving portion 53 is movably attached to the support pillar 54, and includes a pressing portion 55 that pushes the exposed portion 3b of the instrument panel 3, which is placed on the placing table 52, against the placing table 52 from above.

A method of molding the instrument panel unit 2 using the unit molding device 50 will be described below.

Before molding of the instrument panel unit 2, an adhesive is applied to the instrument panel 3 by an applicator (not shown). In such an application step, the adhesive is applied to a part of the sticking portion 3a to which the decorative sheet 4 is stuck, and the groove front-surface 3g and the groove bottom-surface 3i of the insertion groove 3c, and the adhesive is not applied to the groove rear-surface 3h of the insertion groove 3c. An example of the adhesive includes an adhesive which is activated when being heated to a predetermined temperature (for example, 100° C.) or higher.

The molding method of the instrument panel unit 2 comprises a panel setting step STEP (hereinafter, referred simply to as S) 11, a pressing step S12, a sheet setting step S13, and a sheet inserting step S14, and is performed at mom temperature (for example, 27° C.).

First, the panel setting step S11 is performed. In the panel setting step S11, as shown in FIG. 4, an operator places the instrument panel 3 on the placing table 52, and pushes the protrusion portion 3e against the positioning portion 52a thereby performing positioning of the instrument panel 3.

Figure 5:
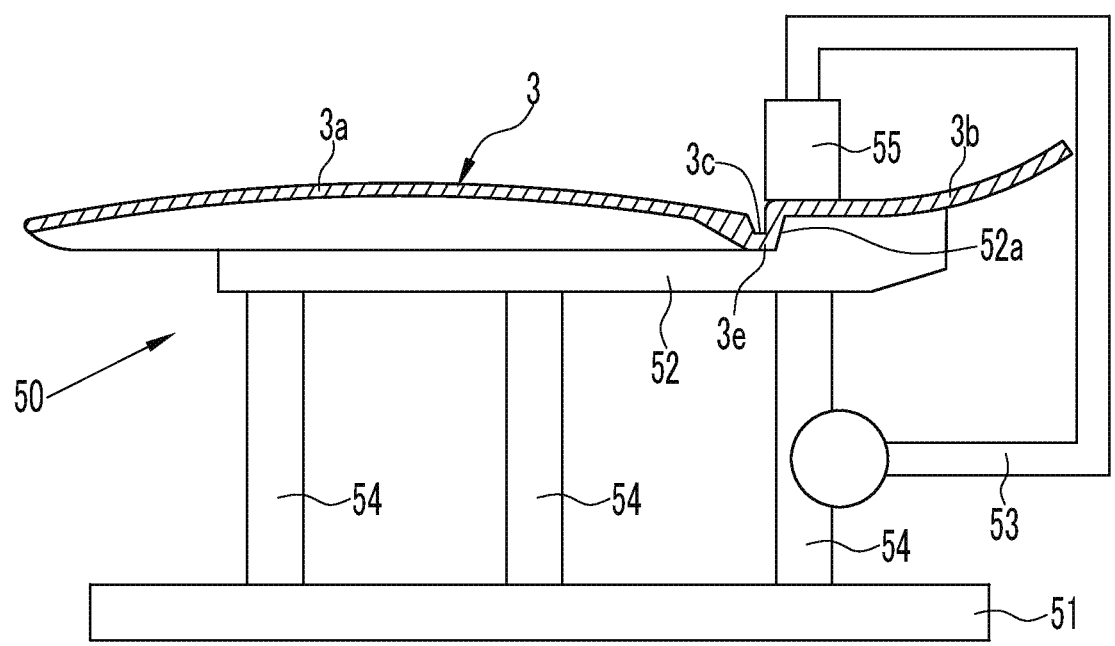
FIG. 5 is a side view showing the instrument panel and the unit molding device in a state where an exposed portion of the instrument panel is pressed against a placing table.

Next, the pressing step S12 is performed. In the pressing step S12, as shown in FIG. 5, the operator moves the moving portion 53 in a downward direction, and pushes the exposed portion 3b of the instrument panel 3 against the placing table 52 with the pressing portion 55.

Figure 6:
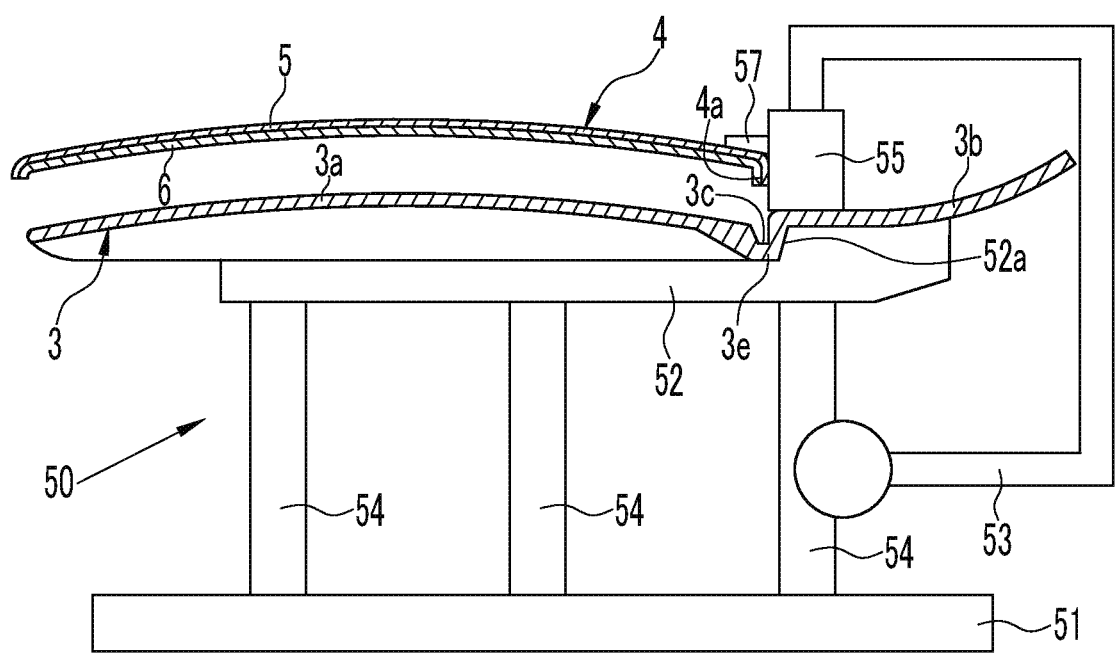
FIG. 6 is a side view showing the instrument panel in which the decorative sheet is set, the decorative sheet, and the unit molding device.

Subsequently, the sheet setting step S13 is performed. In the sheet setting step S13, as shown in FIG. 6, the operator arranges the decorative sheet 4 above the instrument panel 3, and pushes the lateral surface of the bent piece 4a of the decorative sheet 4 against the lateral surface of the pressing portion 55.

Figure 7:
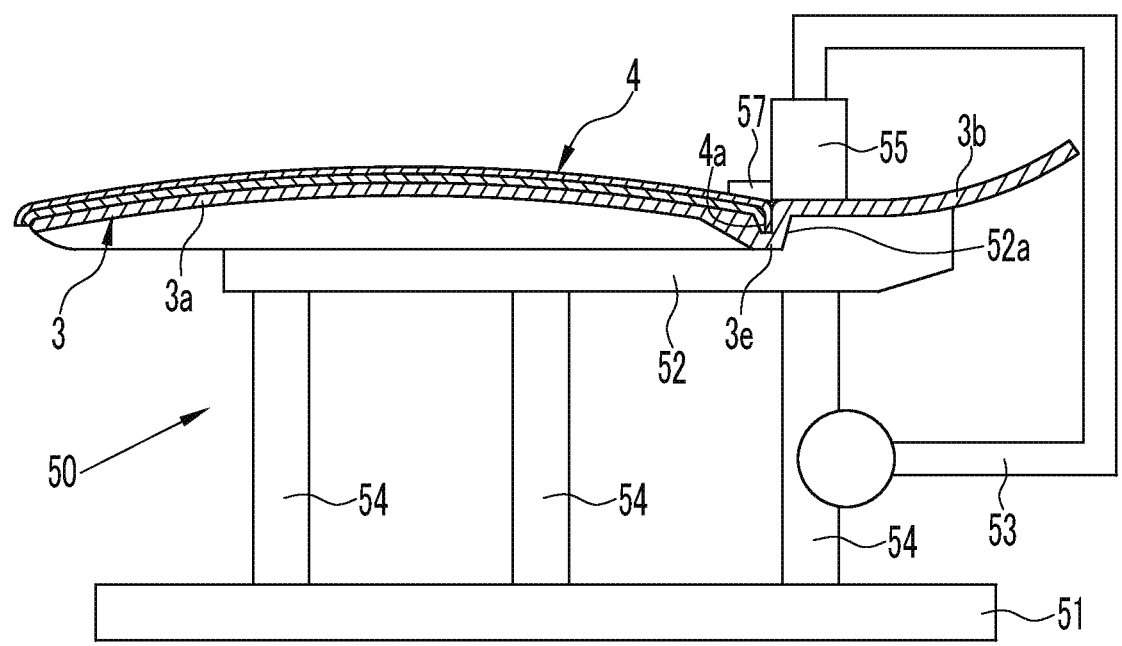
FIG. 7 is a side view showing the instrument panel in a state where a bent piece of the decorative sheet is inserted into an insertion groove of the instrument panel, the decorative sheet, and the unit molding device.

Subsequently, the sheet inserting step S14 is performed. In the sheet inserting step S14, as shown in FIG. 7, the operator moves an insertion assisting plate 57, which is placed on a mar end of the decorative sheet 4, in a downward direction, thereby pushing the rear end of the decorative sheet 4 downwards to insert the bent piece 4a into the insertion groove 3c.

The bent piece 4a of the decorative sheet 4 is formed to be thinner than the groove width at the upper part serving as the entrance part of the insertion groove 3c and to be thicker than the groove width of the groove bottom-surface 3i in the insertion groove 3c. Thus, as shown in FIG. 3A, when the bent piece 4a is inserted into the insertion groove 3c, a lower surface of the bent piece 4a abuts on the groove front-surface 3g of the insertion groove 3c. Therefore, the bent piece 4a can be easily inserted into the insertion groove 3c as compared with a case where the bent piece 4a is thicker than the groove width at the upper part of the insertion groove 3c.

Since the bent piece 4a is thicker than the groove width of the groove bottom-surface 3i of the insertion groove 3c, when the bent piece 4a is inserted into the insertion groove 3c, the bent piece 4a becomes in a press-fit state, and comes in close contact with the groove front-surface 3g and the groove rear-surface 3h of the insertion groove 3c. Note that the bent piece 4a can be inserted into the insertion groove 3c when the foam material 6 of the bent piece 4a is compressed. The cover 5 is pushed against the groove rear-surface 3h due to an elastic force of the foam material 6.

When the bent piece 4a is inserted into the insertion groove 3c, the front lateral surface and the rear lateral surface of the bent piece 4a abut on the groove front-surface 3g and the groove rear-surface 3h of the insertion groove 3c, and the lower surface of the bent piece 4a abuts on the groove bottom-surface 3i of the insertion groove 3c. Thus, the positioning of the bent piece 4a can be performed. The lower surface of the bent piece 4a may hardly abut on the groove bottom-surface 3i.

Further, since the groove front-surface 3g is formed in an uneven shape, the bent piece 4a inserted into the insertion groove 3c is hard to slip compared with a case of no unevenness, and thus the bent piece 4a can be prevented from coming out of the insertion groove 3c.

Figure 8:
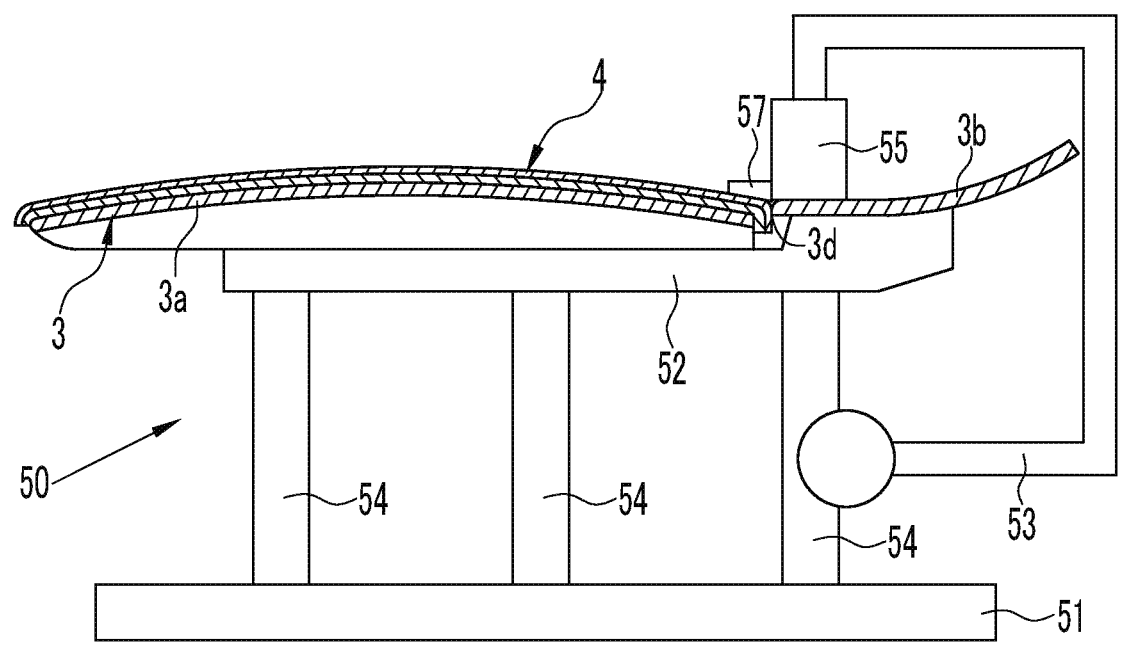
FIG. 8 is a side view showing the instrument panel in a state where the bent piece of the decorative sheet is inserted into an insertion hole of the instrument panel, the decorative sheet, and the unit molding device.

In the sheet inserting step S14, as shown in FIG. 8, the rear end of the decorative sheet 4 is pushed downwards by the insertion assisting plate 57, and the bent piece 4a is inserted into the insertion hole 3d.

The instrument panel unit 2 molded by the respective steps S11 to S14 described above is detached from the unit molding device 50, and is then conveyed to a heating furnace (not shown) in a state of being set in a conveying jig (not shown) capable of holding the instrument panel 3 as in the placing table 52. Then, the instrument panel unit 2 is heated to 100° C. or higher in the heating furnace.

Since the sheet inserting step S14 is performed at room temperature, the adhesive is in a cured state, and the decorative sheet 4 is in a non-bonding state. Then, when the adhesive is heated to 100° C. or higher in the heating furnace, the adhesive is reactivated. In this state, the decorative sheet 4 is pushed against the instrument panel 3 by a pushing apparatus (not shown). Subsequently, the adhesive is cured by cooling of the instrument panel unit 2, and the decorative sheet 4 is firmly attached to the instrument panel 3.

The member to be stuck to the instrument panel 3 is not limited to the sheet, and can be changed as appropriate.

A description will be given below with respect to an injection molding die 100 as a component of a molding device used at the time of the molding of the instrument panel 3.

Figure 9:
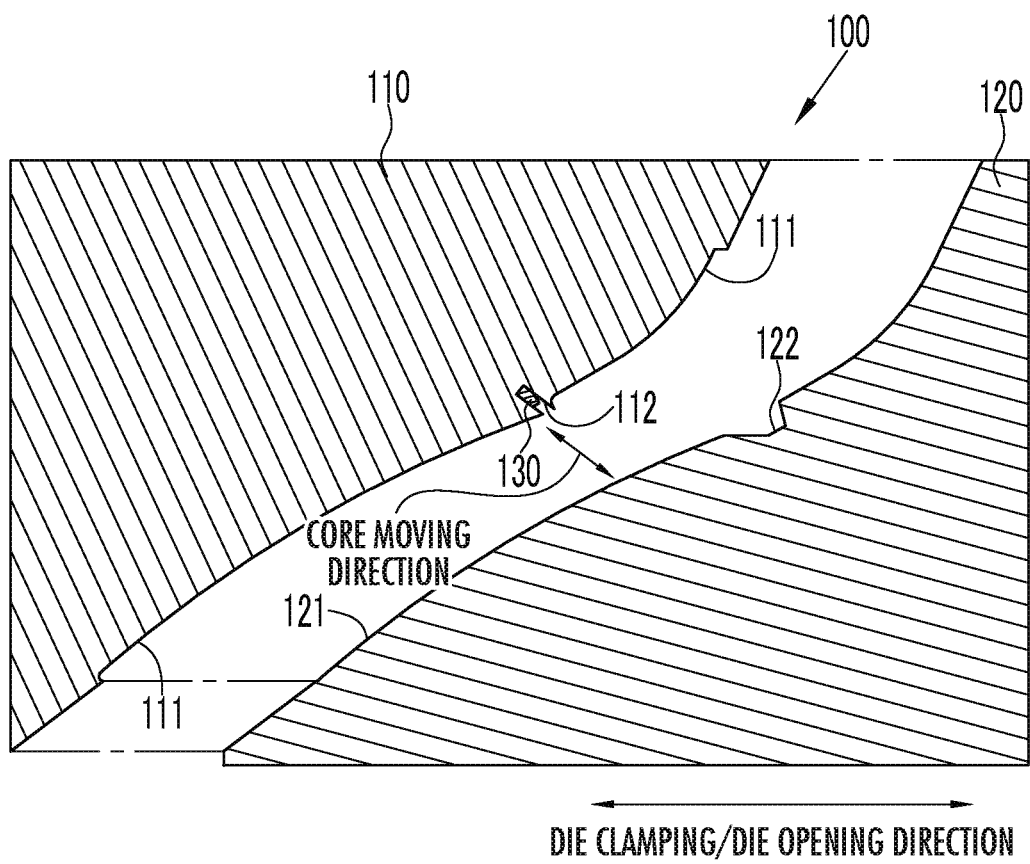
FIG. 9 is a cross-sectional view schematically showing an injection molding die of a molding device in a die opening state, and is a cross-sectional view of a portion where the insertion groove of the instrument panel is molded.
Figure 10:
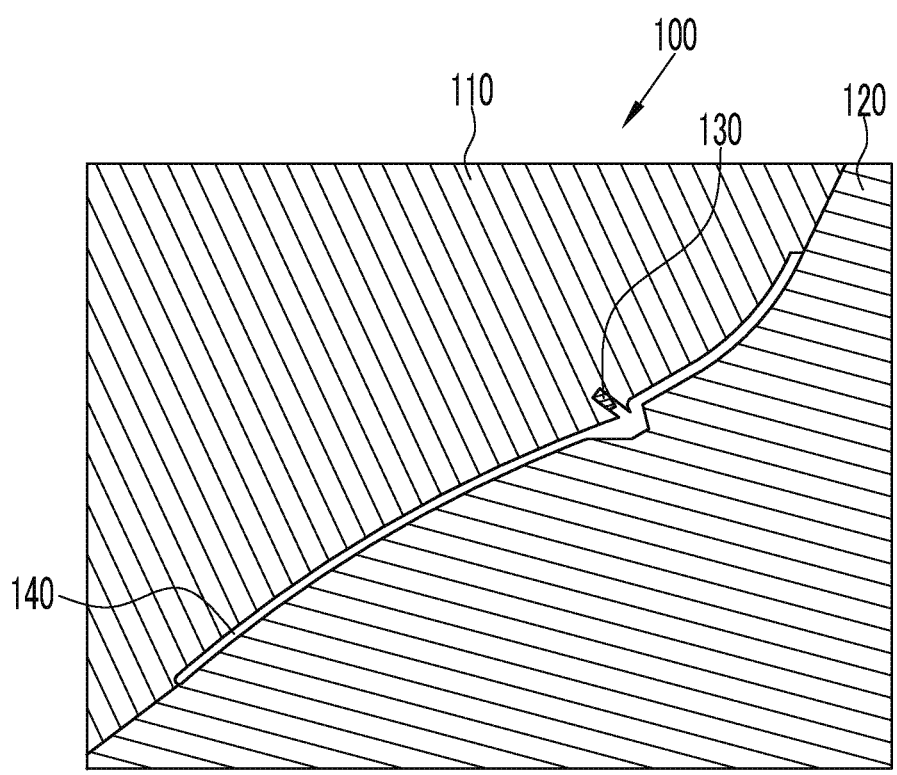
FIG. 10 is a cross-sectional view schematically showing the injection molding die of the molding device in a die clamping state, and is a cross-sectional view of a portion where the insertion groove of the instrument panel is molded.
Figure 11:
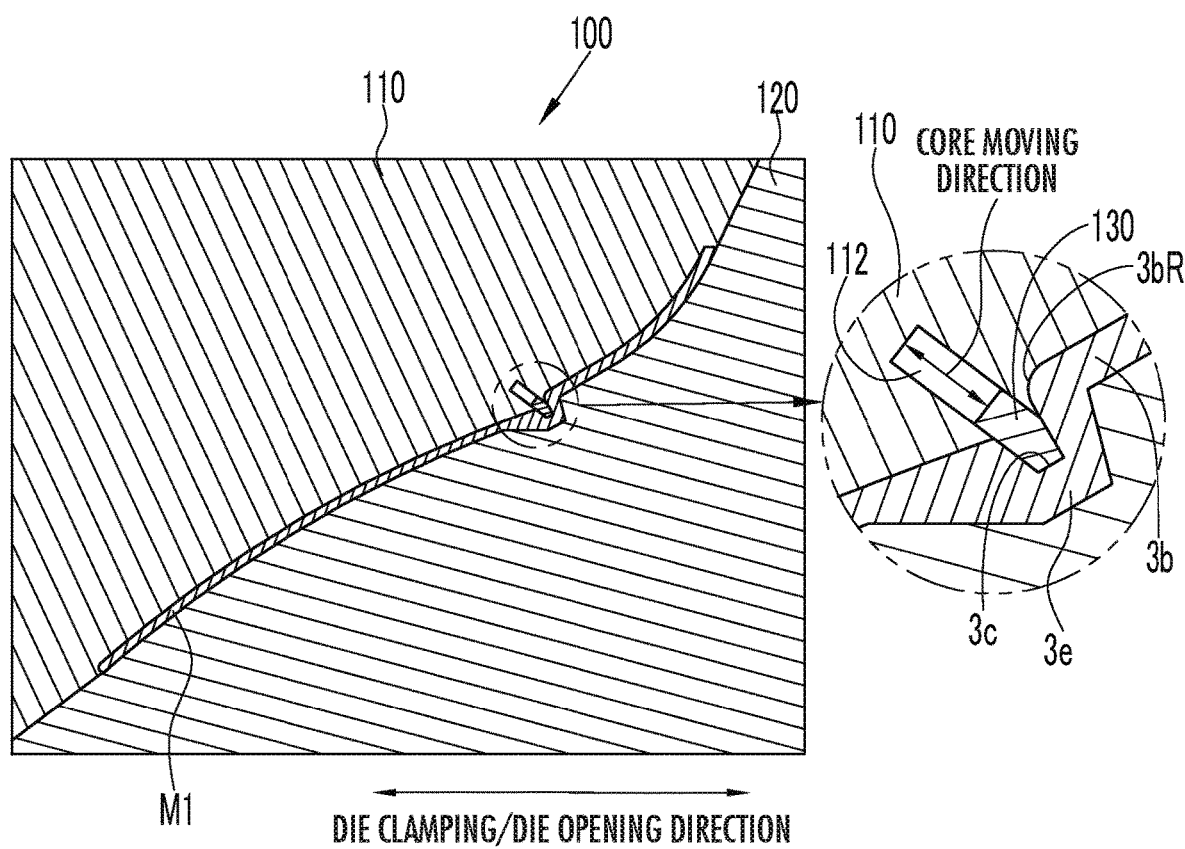
FIG. 11 is a cross-sectional view schematically showing the injection molding die of the molding device in a state where a resin material is filled, and is a cross-sectional view of a portion where the insertion groove of the instrument panel is molded.

As shown in FIGS. 9 to 11, the injection molding die 100 comprises an upper die 110 (first resin molding die), a lower die 120 (second resin molding die), and a core 130 (insertion groove molding portion) used for molding the insertion groove 3c of the instrument panel 3. A plurality of cores 130 (for example, 13 cores) are provided corresponding to the respective insertion grooves 3c. The molding device including the injection molding die 100 is controlled by a controller (not shown).

Die clamping is performed as the lower die 120 relatively approaches the upper die 110, and die opening is performed as the lower die 120 relatively separates from the upper die 110. In the present embodiment, the die clamping is performed as the lower die 120 moves leftward in FIG. 9, and the die opening is performed as the lower die 120 moves rightward in FIG. 9.

The die clamping is performed by the upper die 110 and the lower die 120, thereby forming a cavity 140 in which the instrument panel 3 is molded.

The upper die 110 includes a forming recess portion 111 used for forming the cavity 140 and a supply nozzle (not shown) that injects a resin material M1 used to form the instrument panel 3 into the cavity 140. The forming recess portion 111 includes accommodating recess portion 112 that movably accommodates the core 130. The core 130 is moved by a core moving portion (not shown) configured by a cylinder, for example.

The accommodating recess portions 112 are respectively provided at parts (13 parts) where the insertion grooves 3c of the instrument panel 3 are molded, and the respective accommodating recess portions 112 accommodate the cores 130. The accommodating recess portion 112 is provided such that the direction of movement of the core 130 is a direction (second direction) different from a die clamping/die opening direction (first direction) and parallel to the groove front-surface 3g of the insertion groove 3c.

The forming recess portion 111 is subjected to surface texturing (forming unevenness) on the surface of a pan where the exposed portion 3b of the instrument panel 3 is molded, and the exposed portion 3b is in a surface-textured state. The design properties of the exposed portion 3b can be improved by such surface texturing.

A part of the forming recess portion 111 where the front end rounded portion 3bR of the exposed portion 3b is molded is formed in a rounded shape for molding of the front end rounded portion 3bR having a rounded shape. The rounded part of the forming recess portion 111 is also subjected to surface texturing, and thus the front end rounded portion 3bR of the exposed portion 3b is also in a surface-textured state. The front end rounded portion 3bR of the exposed portion 3b can be visually recognized from the front when being attached to the vehicle, but can be maintained in design properties because of being subjected to the surface texturing in the rounded shape.

In addition, the forming recess portion 111 also molds the upper end of the groove rear-surface 3h between the front end rounded portion 3bR of the exposed portion 3b and a portion molded by the core 130 of the groove rear-surface 3h of the insertion groove 3c. When the forming recess portion 111 in this portion is subjected to surface texturing, the upper end of the groove rear-surface 3h can be brought into a surface-textured state.

The core 130 is movably provided between a protruding position (see FIG. 11) protruding from the accommodating recess portion 112 and a retreated position (see FIG. 9) accommodated inside the accommodating recess portion 112.

The lower die 120 includes a forming recess portion 121 configured to form the cavity 140. Parts (13 parts) of the forming recess portion 121 where the protrusion portions 3e are molded include protrusion-portion forming recess portions 122, respectively.

Figure 12:
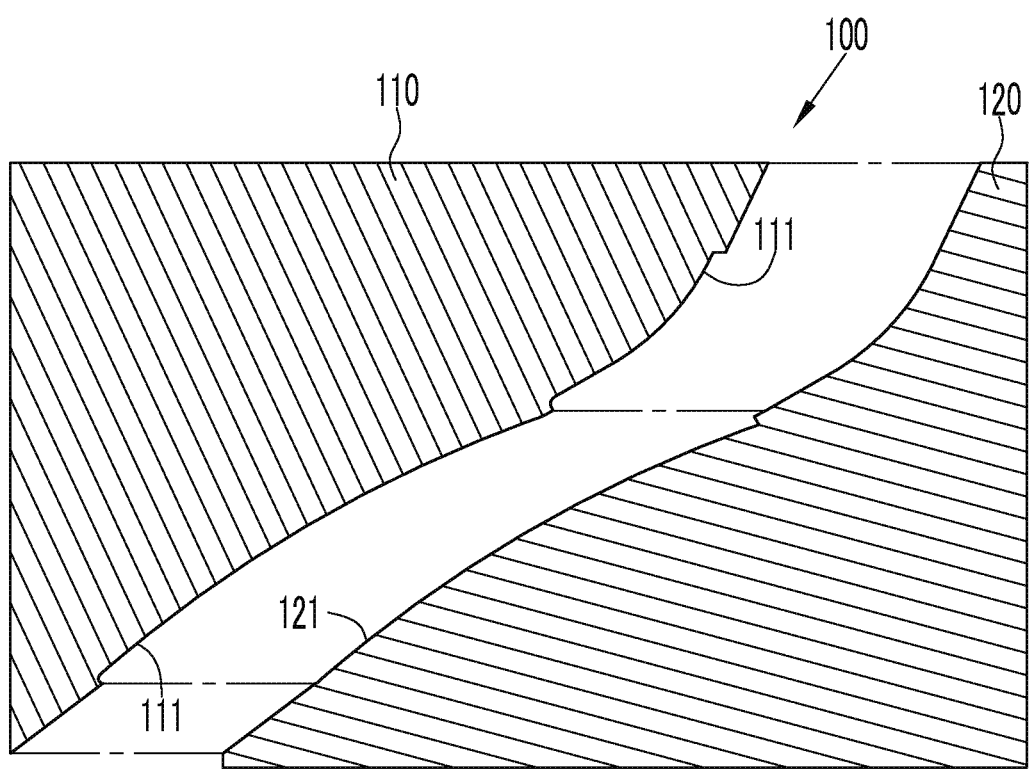
FIG. 12 is a cross-sectional view schematically showing the injection molding die of the molding device in a die opening state, and is a cross-sectional view of a portion where the insertion hole of the instrument panel is molded.
Figure 13:
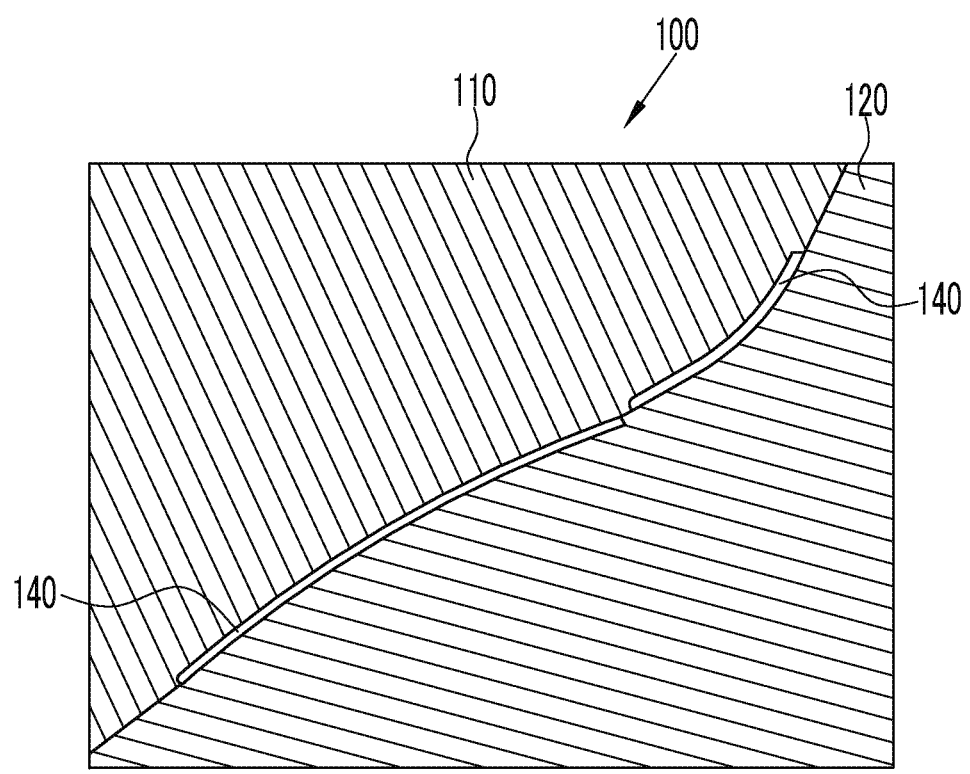
FIG. 13 is a cross-sectional view schematically showing the injection molding die of the molding device in a die clamping state, and is a cross-sectional view of a portion where the insertion hole of the instrument panel is molded.
Figure 14:
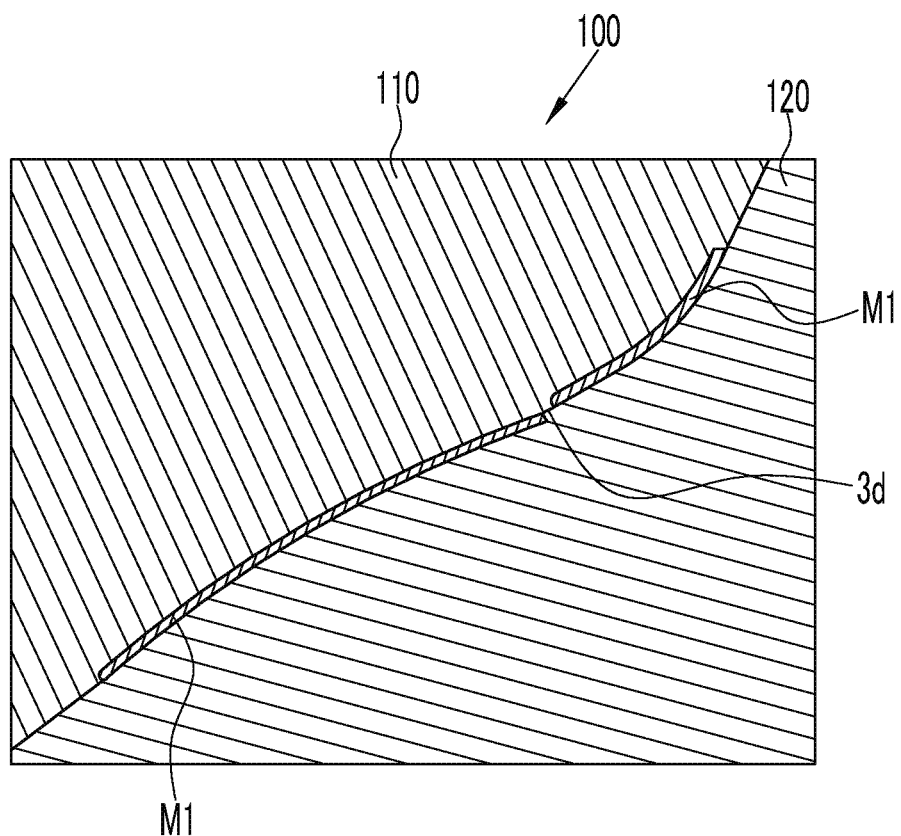
FIG. 14 is a cross-sectional view schematically showing the injection molding die of the molding device in a state where the resin material is filled, and is a cross-sectional view of a portion where the insertion hole of the instrument panel is molded.

In parts (14 parts) where the insertion holes 3d are molded, as shown in FIGS. 12 to 14, the accommodating recess portions 112 are not formed in the upper die 110, and the protrusion-portion forming recess portions 122 are not formed in the lower die 120. Thus, when the die clamping is performed, the upper die 110 and the lower die 120 abut on each other, and the insertion holes 3d are molded. The portion where the upper die 110 and the lower die 120 abut on each other is an insertion hole molding portion.

A description will be given below with respect to a method of molding the instrument panel 3 using the molding device including the injection molding die 100.

The molding method of the instrument panel 3 includes a die clamping step S21, a core protruding step S22, a resin filling step S23, a core retreating step S24, and a die opening step S25.

First, the die clamping step S21 is performed. In the die clamping step S21, as shown in FIGS. 10 and 13, the controller performs die clamping by allowing the lower die 120 to advance relatively to the upper die 110, and thus the cavity 140 is formed. At this time, the core 130 is located at the retreated position by the core moving portion.

Subsequently, the core protruding step S22 is performed. In the core protruding step S22, as shown in FIG. 11, the core 130 is moved from the retreated position to the protruding position by the core moving portion.

Subsequently, the resin filling step S23 is performed. In the resin filling step S23, as shown in FIGS. 11 and 14, the resin material M1 is injected from the supply nozzle by the controller and is filled in the cavity 140.

When the resin material M1 is filled in the cavity 140, the insertion groove 3*c* is molded by the core 130 located at the protruding position. In addition, a part of the upper die 110 and a part of the lower die 120 abut on each other, and thus the insertion hole 3*d* is molded.

After the resin material filled in the cavity 140 in the resin filling step S23 is solidified, the core retreating step S24 is performed. In the core retreating step S24, the core 130 is moved from the protruding position to the retreated position by the core moving portion.

Subsequently, the die opening step S25 is performed. In the die opening step S25, the controller performs die opening by allowing the lower die 120 to retreat relatively to the upper die 110. Then, the instrument panel 3 is detached from the injection molding die 100. Thereby, the instrument panel 3 is molded.

Since the present embodiment has the die structure in which the fitting portion fitted with the bent piece 4*a* of the decorative sheet 4 is configured by the insertion grooves 3*c* and the insertion holes 3*d*, the core 130 can be made smaller as compared with a case where the fitting portion is configured only by the insertion grooves 3*c*. Thus, as compared with a case where the core is large, molding defects can be reduced and shape defects of the resin molded article can be reduced.

REFERENCE SIGNS LIST

2 . . . instrument panel unit, 3 . . . instrument panel (resin molded article), 4 . . . decorative sheet (attachment member), 4*a* . . . bent piece, 5 . . . cover, 6 . . . foam material, 3*a* . . . sticking portion, 3*b* . . . exposed portion. 3*b*R . . . front end rounded portion, 3*c* . . . insertion groove, 3*d* . . . insertion hole, 3*g* . . . groove front-surface (first lateral surface), 3*h* . . . groove rear-surface (second lateral surface). 3*i* . . . groove bottom-surface. 50 . . . unit molding device, 100 . . . injection molding die, 110 . . . upper die (first resin molding die), 120 . . . lower die (second resin molding die). 130 . . . core (insertion groove molding portion)

The invention claimed is:

1. A resin molded article in which a fitting portion fitted with a bent piece formed at one end of an attachment member is extendedly provided, the attachment member being attached to a surface of the resin molded article, wherein
    the fitting portion comprising:
    an insertion hole into which the bent piece is inserted, the insertion hole penetrating from the surface to a rear surface; and
    an insertion groove into which the bent piece is inserted, the insertion groove being formed in the surface in a recess shape.

2. The resin molded article according to claim 1, wherein the fitting portion is extendedly provided in a non-linear shape in a longitudinal direction of the resin molded article.

3. The resin molded article according to claim 1, wherein one end surface of the bent piece abuts on a bottom surface of the insertion groove, and
lateral surfaces of the bent piece abut on lateral surfaces of the insertion groove.

4. The resin molded article according to claim 1, wherein a first lateral surface which abuts on a rear surface of the bent piece, of lateral surfaces of the insertion groove, is formed such that a width between the first lateral surface and an opposing second lateral surface gradually increases in a direction from the rear surface toward the surface.

5. The resin molded article according to claim 4, wherein an uneven portion is formed on the first lateral surface.

6. The resin molded article according to claim 1, wherein a plurality of the insertion holes and a plurality of the insertion grooves are provided alternately.

* * * * *